Figure 1:
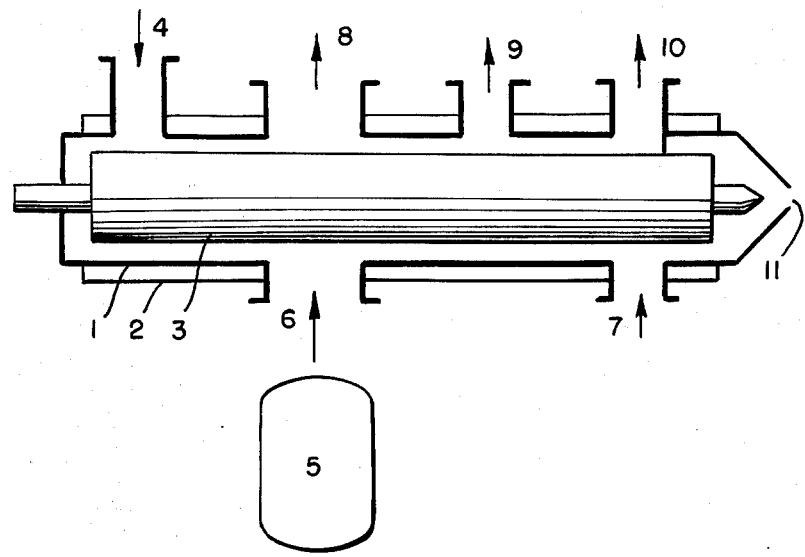

United States Patent [19]

Wild et al.

[11] 4,065,532

[45] Dec. 27, 1977

[54] PROCESS FOR THE ADMIXTURE OF ADDITIVES INTO PLASTICS WITH SIMULTANEOUS REMOVAL OF VOLATILE CONSTITUENTS

[75] Inventors: Hans Wild, Frankenthal; Guenter Jeckel, Landau; Adolf Echte, Ludwigshafen; Johann Zizlsperger, Schriesheim; Rudi Wilhelm Reffert, Beindersheim; Gunter Thielen, Ludwigshafen, all of Germany

[73] Assignee: BASF Aktiengesellschaft, Ludwigshafen, Germany

[21] Appl. No.: 564,618

[22] Filed: Apr. 3, 1975

[30] Foreign Application Priority Data

| Apr. 11, 1974 | Germany | 2417792 |
| Feb. 19, 1975 | Germany | 2507061 |
| Mar. 6, 1975 | Germany | 2509744 |

[51] Int. Cl.² .......................... B29B 1/04; B29B 1/10
[52] U.S. Cl. ........................................ 264/68; 264/37;
  264/102; 264/211; 264/349; 425/812; 366/75;
  366/78; 366/80
[58] Field of Search ............... 264/349, 37, 68, 101,
  264/102, 176 R, 211; 425/812, 203, 131.1;
  259/191, 192; 260/42 R

[56] References Cited

U.S. PATENT DOCUMENTS

| 3,023,456 | 3/1962 | Palfey | 425/812 |
| 3,040,005 | 6/1962 | Bernhardt et al. | 264/349 |
| 3,376,603 | 4/1968 | Colombo | 425/203 |
| 3,410,938 | 11/1968 | Schippers | 425/203 |
| 3,563,514 | 2/1971 | Shattuck | 425/203 |
| 3,742,093 | 6/1973 | Skidmore | 264/349 |

FOREIGN PATENT DOCUMENTS

| 1,261,661 | 2/1968 | Germany | 264/349 |

*Primary Examiner*—James B. Lowe
*Attorney, Agent, or Firm*—Keil, Thompson & Shurtleff

[57] ABSTRACT

A process for admixing additives to plastics and simultaneously removing volatile constituents in a horizontal devolatilizing extruder. Taken in sequence in the direction of flow, the additives are first introduced into the devolatilizing extruder from above, and the plastic melt, solution or dispersion is then introduced from below, while the bulk of the volatile constituents are withdrawn from the devolatilizing extruder at an orifice located vertically above the point at which the plastic is fed in. The process permits the removal of volatile constituents with simultaneous admixture of additives during aftertreatment of plastics, in a single step and at very high throughputs.

9 Claims, 3 Drawing Figures

PROCESS FOR THE ADMIXTURE OF ADDITIVES INTO PLASTICS WITH SIMULTANEOUS REMOVAL OF VOLATILE CONSTITUENTS

The present invention relates to a process for admixing additives to plastics with simultaneous removal of volatile constituents in a devolatilizing extruder.

Plastics are in general manufactured by polymerization or polycondensation of the monomers in bulk, in solution or in dispersion. During working up, unconverted monomers, solvents or dispersion media must be removed as completely as possible. This is generally effected by devolatilization at elevated temperatures in an extruder. The devolatilization has to be carried out as gently as possible since otherwise heat-sensitive plastics may undergo partial decomposition, leading to discoloration or the formation of dark specks in the plastic. It is expedient to admix the requisite or desired additives to the plastic simultaneously with the devolatilizing treatment so as to avoid having to melt the plastic once more.

German Published Application No. 1,454,745 describes such a process and an apparatus for the simultaneous devolatilization and coloration of plastic melts. The apparatus consists of an extruder with two successive orifices, a color masterbatch being introduced through the first orifice, followed by the bulk of the plastic introduced through the second orifice. After melting the materials and mixing the melts, the mixture is freed from volatile constituents in a devolatilizing zone, where they escape as gas through a further orifice. This process permits gentle devolatilization and coloring but has the disadvantage that the achievable throughput is limited. This is due to the fact that, firstly, the plastic melt tends to foam if there is an excessively abrupt pressure drop at the devolatilization orifice and, secondly, the melt cools considerably due to the loss of the heat of vaporization during devolatilization. Both effects reduce the throughput. The melt must be brought to the devolatilization orifice sufficiently slowly to prevent excessive foaming and must be reheated - which is time-consuming - after it has lost the heat of vaporization, so as not to become too viscous.

A different process is described in German Published Application No. 1,949,489. Here, the plastic melt and an additive masterbatch are introduced into two separate zones of a twin-screw or four-screw extruder of which one screw, or one pair of screws, is so designed that the volatile constituents can be drawn off backwards, in the opposite direction to the flow of the product.

It is an object of the present invention to provide a very simple and gentle process for the simultaneous admixture of additives to plastics and removal of volatile constituents, which provides a very high devolatilizing efficiency coupled with rapid throughput of plastic.

We have found that this object is achieved by a process wherein, taken in sequence in the direction of flow, the additives are first introduced into a devolatilizing extruder from above and the plastic is then introduced from below, whilst the bulk of the volatile constituents are withdrawn from the devolatilizing extruder at an orifice located vertically above the point at which the plastic is fed in.

Plastics to which the process is applicable are, above all, thermoplastically processable polymers and polycondensates such as polyolefins, polystyrene, polyvinyl chloride, polymethyl methacrylate, polyamides and polyacetals, as well as synthetic rubbers such as polymers of butadiene and polymers of isoprene. The method according to the invention offers particular advantages when processing heat-sensitive copolymers of styrene or α-methylstyrene with from 10 to 80 per cent by weight of acrylonitrile, methacrylonitrile or maleic anhydride, or the corresponding graft copolymers which have been made impact-resistant by means of polybutadiene or polyacrylic ester rubbers (ie. ABS and ASA polymers).

The plastics which have been manufactured by bulk polymerization or solution polymerization in general contain from 10 to 70, preferably from 30 to 60, per cent by weight of volatile constituents before being subjected to devolatilization. Where plastics are manufactured by bulk polymerization, the reaction can only in the rarest of cases be taken to completion, since the viscosity of the melt would otherwise become excessive. Consequently, the plastic melt always contains some residual monomers which the process according to the invention is intended to remove. In the case of a solution polymerization, the polymer retains solvent such as the conventional normally liquid organic compounds, eg. ethers, alcohols and aliphatic or aromatic hydrocarbons.

In the case of polymer dispersions, the content of volatile constituents is as a rule from 30 to 80% by weight, and preferably from 40 to 70% by weight, based on the dispersion, before being subjected to devolatilization. Polymer dispersions are in this context to be understood to include any dispersions obtained by conventional and customary emulsion polymerization processes or suspension polymerization processes. However, the dispersions can also be prepared by subsequently dispersing plastics in, eg., water. Volatile constituents in the polymer dispersions are in the main the dispersing agent and possibly also residual monomer if the polymerization has not been taken to complete conversion.

As already explained, the plastics are in the form of melts, solutions or dispersions before introduction into the extruder. They are preferably preheated to from 150° to 250° C in a heat exchanger and then fed into the extruder as a liquid under a pressure at least equal to the vapor pressure of the voltaile constituents at the temperature concerned.

Additives which may be admixed to the plastics are recycled material originating from scrap which has arisen during further processing or reprocessing of the plastic; other plastics, eg. elastomers or elastomer-modified plastics; fillers, eg. glass fibers or other inorganic reinforcing agents; plasticizers; pigments; dyes, lubricants, antistatic agents or stabilizers, which are preferably added to the plastic in the form of concentrated masterbatches. The additives are generally introduced into the extruder in a finely divided form, eg. as granules or powders. If, in addition to solid additives, major amounts of liquid additives, eg. certain plasticizers or lubricants, also have to be introduced, then this is preferably done through a separate feed orifice after the devolatilizing zones. The amount of additives is preferably from 1 to 50, especially from 5 to 25, per cent by weight based on the plastic.

The extruder used in the process of the invention preferably comprises at least 2 horizontal screws. Twin screws which are arranged alongside one another and either touch or intermesh and are driven in counterrotation are particularly preferred. However, single-screw extruders can also be used in the same way. To achieve better mixing, baffles or kneading discs may be fitted to the screws to intensify the material exchange between one zone of the screw and the next.

The additives are fed into the extruder from above and the plastic melt, solution or dispersion is fed in from below. Vertically above the orifice through which the plastic melt, solution or dispersion is fed in, an orifice is provided through which the bulk, ie. at least 50 per cent by weight, of all the volatile constituents, preferably more than 60 per cent by weight, are removed by volatilization. The phrase "vertically above" is however intended to include constructional embodiments in which the devolatilization orifice is displaced slightly forwards or backwards. Naturally, the devolatilization orifice can also be narrower or broader, or thicker or thinner, than the feed orifice.

Because the melt, and therefore also the volatile constituents, are preheated, the pressure at the point at which the plastic melt is fed in is superatmospheric; the ensure effective devolatilization it is desirable that the pressure at the devolatilization orifice should be atmospheric pressure, or sub-atmospheric pressure as a result of the volatile constituents being pumped off. This pressure at the devolatilization orifice should be kept as constant as possible.

FIG. 1 is a schematic side elevation of a twin-screw extruder, which is preferred for carrying out the process according to the invention. Two screws 3 counter-rotate and intermesh in an extruder barrel 1 provided with a heating jacket 2. The additives are added as solids at the feed point 4. An additional feed point for adding liquid additives may be provided if appropriate. The polymer dispersion, solution or melt is preheated in a heat exchanger 5 and fed as a liquid to the feed point 6. The bulk of the volatile constituents are removed by devolatilization at an orifice 8 located vertically above the feed point 6. Further devolatilization may be effected through the orifice 9. In a particular embodiment of the invention, an entraining agent is introduced from below at a feed point 7; this entrains residual volatile constituents when it leaves the extruder through the devolatilization orifice 10 which is preferably located vertically above the feed point 7. Finally, the melt is extruded through a die 11.

Entraining agents which may be used are superheated steam, inert gases or readily volatile organic solvents. This method permits devolatilization down to a residual content of, preferably, less than 1% by weight, and in particular less than 0.5% by weight, of volatile constituents.

Figure 2:
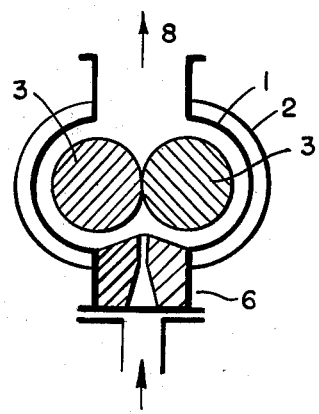
Figure 3:
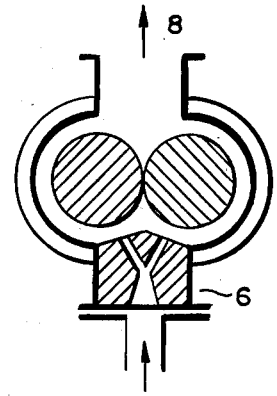

FIGS. 2 and 3 show two possible constructional embodiments of the point 6 at which the plastic melt is fed in. According to these embodiments, the plastic melt to be fed in may be introduced through one or more nozzle-like holes into the gap below the pair of screws. These holes can also be in the form of slits running along the axis of the screws. An advantageous embodiment of the nozzle-like holes at the feed point 6 is such that the orifices of the nozzles may be varied, or closed, during operation, by means of a variable throttle device. Similar comments also apply to the feed point 7.

In a particular embodiment, the two screws counter-rotate so as to draw the plastic melt, introduced from below, downwards into the gap between the screws.

If a single-screw devolatilizing extruder is used, it is constructed in the same way as that described above, apart from the number of screws. The point 6 for feeding in the plastics can be located vertically below the screw but can also be slightly displaced sideways, ie. transversely to the screw. This makes it possible to vary and improve the devolatilizing performance of a single-screw extruder.

The process of the invention permits simultaneous admixture of additives and removal of volatile constituents during post-treatment of plastics at very high throughputs. The increase in throughput compared to conventional processes is achieved, firstly, through the fact that foaming, which otherwise interferes, can no longer occur during devolatilization, and secondly through the improved heat supply in the process of the invention, since the volatile constituents vaporize immediately after entering the extruder. The heat required for this is abstracted from the melt, which consequently is cooled. This results in a high temperature gradient between the product and the extruder wall which facilitates heat transfer so that a greater amount of heat can be introduced. In addition, the viscosity of the melt rises immediately behind the feed orifice, due to cooling, so that the increased shear on rotation of the screw additionally and desirably heats the melt through energy transfer from the screw.

The parts and percentages in the Examples are by weight.

EXAMPLES 1 a + b

A 60% strength solution of a styrene-acrylonitrile copolymer, containing 25% of acrylonitrile, is separated into solids and volatile constituents, the latter consisting of the monomers and inert aromatic solvent, in a twin-screw devolatilizing extruder constructed according to the invention, as shown in FIG. 1, and having screws of 2.0 inch diameter which touch and counter-rotate, as shown in FIG. 3. Simultaneously with devolatilization, the copolymer is mixed with thermoplastic color masterbatch and colored recycled material.

The extruder is heated by means of its heating jacket, using a heat exchange liquid at 260° C. The screws are driven at 200 rpm.

The orifices (7) and (10) are closed and not in operation.

The copolymer solution is fed to the extruder via the heat exchanger (5) and is heated to 190° C at a pressure of 15 atmospheres gauge. The feed zone in the extruder is constructed as shown in FIG. 1 or FIG. 3. The feed slits extend over the entire length of the devolatilizing zone (8) and are about 30 cm long. A vacuum of 40 or 30 mm Hg is applied to the devolatilizing zone 8 and 9 and the solvent vapors removed are recovered in a subsequent condensation and vacuum installation.

Color master batches and previously colored recycled material are introduced into the feed orifice 4. The copolymer freed from volatile constituents, homogeneously mixed with the additives introduced at 4, is extruded as ribbon through a die plate on the die head 11, and granulated after passing through a cooling zone.

The table which follows shows results obtained with the method according to the invention in two experiments (a and b).

The residual content of volatile constituents was determined by devolatilizing about 1 g of polymer for 25 minutes at 1 mm Hg and 213° C. The weight loss corresponds to the residual content of volatile constituents.

|  | Orifice | | Amount | Material | Volatile constituents |
|---|---|---|---|---|---|
| Feed to the extruder | (4) | a) | 9 kg/hr | color master batch and copolymer | 0.6% |
|  |  | b) | 16 kg/hr |  | 0.6% |
|  | (6) | a) | 75 kg/hr | 60% strength copolymer |  |
|  |  | b) | 133 kg/hr | solution |  |
|  | Orifice | | Amount | Material | Residual volatile constituents |
| Output from the extruder | (8) | a) | 25 kg/hr | Solvent and monomer |  |
|  |  | b) | 42 kg/hr |  |  |
|  | (9) |  | not measured |  |  |
|  | (11) | a) | 54 kg/hr | homogeneously colored | 0.4% |
|  |  | b) | 96 kg/hr | copolymer | 0.6% |

COMPARATIVE EXAMPLE

The Example describes the situation on conventional operation of the extruder.

In contrast to Example 1, the heated copolymer solution is fed to an orifice located between the orifices (4) and (8). There is no orifice (6). In other respects the extruder is operated as in example 1.

Even at throughputs as low as 75 kg/hr of copolymer solution, intermittent foaming is observed in the devolatilizing zone (8), and this means that the operation is unsafe since there is the danger that subsequent pipelines and condensation equipment may become blocked. It is also found that the coloration is inhomogeneous and the residual content of volatile constituents fluctuates greatly.

If the preheat temperature is lowered from 190° C to about 140° C, the intermittent foaming in the devolatilizing zone (8) can be reduced to a tolerable degree but the residual content of volatile constituents in the end product rise to from 0.8 to 1.0%. If the throughput is increased to >75 kg/hr of copolymer solution, an unacceptable degree of foaming is again observed in the devolatilizing zone (8), accompanied by an increase in the residual content of volatile constituents.

EXAMPLE 2 a + b

The invention is followed as in Example 1, but in addition a vacuum of 40 mm Hg is applied to the devolatilizing orifice (10) and about 2 kg/hr of steam, at a temperature of 200° C, are blown into the extruder through the orifice (7) constructed in accordance with the invention, as shown in FIG. 2; this steam escapes from the orifice (10), together with residual volatile constituents.

It is found that the residual content of volatile constituents is lowered to 0.2% at throughput (a) and 0.5% at throughput (b).

EXAMPLE 3

The extruder used in Example 1 is employed to produce a high-impact polystyrene containing polybutadiene.

The extruder is heated to 240° C. 30 kg/hour of high-impact polystyrene, containing 8% of polybutadiene, in the form of a solid, and 20 kg/hour of a mixture of polystyrene color masterbatch and colored recycled material are continuously introduced through the orifice (4).

100 kg/hour of a 70% strength solution of polystyrene in styrene, which has been heated to 200° C under 18 atmospheres gauge, are introduced through the feed orifice (6).

A vacuum of 40 mm Hg is applied to the devolatilizing zone (8) and of 10 mm Hg to the zone (9).

120 kg/hour of colored polystyrene blend containing 0.2% of volatile constituents are obtained.

If the polystyrene solution is not fed in according to the invention but is fed in conventionally as described in the Comparative Example, the throughput of polystyrene solution must be lowered to from 60 to 70 kg/hr, since otherwise the devolatilizing chamber (8) may foam over, intermittent foaming being observed. Lowering the temperature in the preheater (5) increases the residual content of volatile constituents in the end product.

EXAMPLE 4

The extruder used in Example is employed to produce a transparent thermoplastic molding material based on polyvinyl chloride, as described in German Published Application No. 2,152,366.

The extruder is heated to 180° C. 48 kg/hr of polyvinyl chloride and 8 kg/hr of a solid graft rubber are introduced through the orifice (4). The 70:30 α-methylstyrene/acrylonitrile copolymer is fed into the orifice (6) in accordance with the invention, at 180° C and 16 atmospheres gauge, at the rate of 48 kg/hr, in the form of a 50% strength solution in its monomers, in the presence of an inert aromatic hydrocarbon. 80 kg/hr of transparent molding material containing 0.3% of residual volatile constituents are extruded at (11).

If the conventional method is used, it is necessary to reduce the throughput to from 40 to 50 kg/hr, since heavy foaming occurs in the devolatilization orifice (8).

EXAMPLE 5

A twin-screw extruder as used in FIG. 1, having 53 mm diameter screws which co-rotate and intermesh tightly, is used to manufacture a carbon black-reinforced high molecular weight polyisobutylene from its solution in cyclohexane. The extruder is heated to 150° C and is driven at 150 rpm. The feed orifice (7) is closed, as is the devolatilization orifice (10).

6 kg/hr of a 50% strength concentrate of active carbon black in polyisobutylene and 3 kg of polyethylene containing stabilizer are fed into the extruder at (4).

60 kg/hr of a 50% strength solution of polyisobutylene in cyclohexane, which has been heated to 150° C under 15 atmospheres gauge, are introduced at (6). The feed point is constructed as in FIG. 2.

39 kg/hr of a carbon black-reinforced polyisobutylene mixture containing 0.13% of residual volatile constituents are obtained.

We claim:

1. In a process for the admixture of additives to thermoplastically processable polymers containing volatile constituents, with simultaneous removal of the volatile constituents, through separately feeding additives and a polymer melt, solution or dispersion into a horizontal devolatilizing screw extruder, and then heating, mixing and conveying the charge whilst vaporizing the volatile constituents, and finally extruding the mixture, the improved steps taken in sequence in the direction of flow along the extruder which comprise:

first introducing the additives downwardly into the extruder from above;

then introducing the polymer in a liquid form as said melt, solution or dispersion, preheated to a temperature of from 150° to 250° C, upwardly into the extruder from below under a pressure which corresponds at least to the vapor pressure of the volatile constituents at the temperature concerned, thereby immediately vaporizing said volatile constituents;

simultaneously withdrawing at least 50 percent of the volatile constituents upwardly from the extruder at an orifice located approximately vertically above the point at which the polymer is being introduced from below; and advancing the polymer forwardly from its point of introduction under shear by the screw so that the cooling of the polymer due to said vaporization is compensated by the simultaneous heating of the polymer in the screw extruder which is increased by transfer of shear energy from the screw.

2. A process as claimed in claim 1, wherein the polymer melt or solution contains from 10 to 60 percent by weight of volatile constituents before devolatilization and the polymer dispersion contains from 30 to 80 percent by weight of volatile constituents before devolatilization.

3. A process as claimed in claim 1, wherein from 1 to 50 percent by weight of additives are incorporated into the polymer.

4. A process as claimed in claim 1, wherein a devolatilizing extruder with at least two screws is employed.

5. A process as claimed in claim 4, wherein the devolatilizing extruder comprises two screws which are arranged alongside one another and either touch or intermesh.

6. A process as claimed in claim 5, wherein the twin screws are driven so that they counter-rotate and draw product downwards into the gap between them.

7. A process as claimed in claim 1, wherein the pressure at the point at which the plastic is fed in, being the saturation vapor pressure of the volatile constituents, is above atmospheric pressure, whilst the devolatilization orifice is at atmospheric pressure or preferably at subatmospheric pressure, and substantially constant, as a result of pumping off the volatile constituents.

8. A process as claimed in claim 1, wherein further devolatilization orifices are provided along the devolatilizing extruder, in the direction of flow.

9. A process as claimed in claim 8, wherein an entraining agent is fed into the devolatilizing extruder behind the feed point of the plastic viewed in the direction of flow and the entraining agent together with the residual volatile constituents of the plastic mixture again leaves the devolatilizing extruder at the devolatilization orifices.

* * * * *